United States Patent [19]

Habermann et al.

[11] 4,077,856

[45] Mar. 7, 1978

[54] REMOVAL OF MERCURY FROM LIQUIDS

[75] Inventors: Wolfgang Habermann, Mainz; Dieter Stockburger, Gruenstadt; Peter Thoma, Frankenthal; Gotthard Csizi, Bad Duerkheim, all of Germany

[73] Assignee: BASF Aktiengesellschaft, Ludwigshafen, Germany

[21] Appl. No.: 675,611

[22] Filed: Apr. 9, 1976

[30] Foreign Application Priority Data

Apr. 25, 1975 Germany ............................. 2518433

[51] Int. Cl.² ................................................ C02C 5/12
[52] U.S. Cl. .................................... 204/149; 204/1 R; 204/130; 204/153; 204/DIG. 3
[58] Field of Search ................. 204/1 R, DIG. 3, 130, 204/131, 149, 153

[56] References Cited

U.S. PATENT DOCUMENTS

| | | | |
|---|---|---|---|
| 3,457,152 | 7/1969 | Maloney, Jr. et al. | 204/131 |
| 3,716,459 | 2/1973 | Salter et al. | 204/1 R |
| 3,755,114 | 8/1973 | Tarjanyi et al. | 204/149 X |
| 3,761,383 | 9/1973 | Backhurst et al. | 204/268 |
| 3,764,499 | 10/1973 | Okubo et al. | 204/151 |

Primary Examiner—Arthur C. Prescott
Attorney, Agent, or Firm—Keil, Thompson & Shurtleff

[57] ABSTRACT

In a process for the removal of mercury by treatment with elementary nickel an external voltage is applied to maintain the potential of the nickel at a value which differs from the potential of the reversible hydrogen electrode in the liquid concerned by not more than from −250 mV to +50 mV. The treatment is carried out at temperatures of from 80° to 230° C.

10 Claims, No Drawings

REMOVAL OF MERCURY FROM LIQUIDS

In the manufacture of caustic alkali metal solutions by the amalgam process or the synthesis of sodium alkoxide by reaction of methanol with sodium amalgam there are obtained solutions which contain, inter alia, mercury in elementary form. Subsequent applications of these solutions frequently require that the mercury be removed, particularly when the solutions are to be used in the preparation of foodstuffs or pharmaceuticals.

Hitherto, caustic alkali solutions have mainly been purified by mechanical means either by filtration using special carbon filters or by centrifuging methods. Removal of mercury by these methods leaves a residual content of from 0.5 to 1 ppm, which is still too high for many applications. In another known process the caustic solution contaning mercury is filtered through a layer consisting of activated charcoal impregnated with silver. However, this process has not been adopted in industry, since the silver-impregnated activated charcoal shows a ready tendency to decompose explosively.

Finally, a process for the removal of mercury from aqueous alkali metal hydroxide solutions is known in which the solutions are passed through a layer containing polyethylene, polytetrafluoroethylene, graphite, charcoal and activated charcoal in lump form and also a metal, for example nickel, stainless steel and tantalum.

Using this process it is again only possible to reduce the mercury concentration to about 0.15 to 0.8 ppm, in the continuous treatment of aqueous alkali metal hydroxide solutions, whilst the treatment of, for example, methanolic solutions of sodium methoxide by this method achieves a reduction in the mercury content of the treated solution for a short time only.

In another known process, caustic soda solution is pumped through a cell having a porous cathode for the purpose of removing metal impurities. The metals are reduced at the cathode, where they are deposited. The cathode consists of a tube of porous plastics material closed at one end. The metal deposites in time reduce the porosity of the cathode and thus increase the resistance to flow. When the counterpressure reaches a specific value, the cathode must be cleaned.

It is an object of the present invention to provide a process for the removal of mercury from liquids by treatment of the liquids with nickel, which method ensures substantial removal of the mercury even when carried out continuously.

We have found that this object is achieved by causing the solutions to act on nickel at temperatures of from 80° to 230° C, the potential of the nickel being adjusted by the application of an external voltage to a value which differs from the potential of the reversible hydrogen electrode in the liquid being treated by not more than −250 mV to +50 mV.

The nickel is advantageously used in a finely divided and activated form, for example in the form of Raney nickel, carbonyl nickel powder, nickel sponge, nickel felt, nickel chips or nickel wool or in the form of nickel deposited on a support of high surface area, for example silicic acid or aluminum oxide.

The finely divided nickel is used, for example, in the form of loose packings in columns mounted, say, between net cathodes of nickel or stainless steel. The solution to be purified is pumped through these packings. Alternatively, the nickel may be in the form of a layer placed on a filter or in the form of a suspension in a stirred vessel.

Adjustment of the nickel potential is effected by means of an external source of voltage and a counterelectrode. The counterelectrode may be of platinum, graphite or magnetite. The amount of electrical energy consumed is low, since its purpose is merely to avoid the formation of dense oxide layers on the nickel. For example, when using 100 l of nickel wool or nickel chips in 50% w/w caustic soda solution or 30% w/w methanolic sodium methoxide solution, a current of only 50 mA per 50 kg of nickel is required to maintain said potential.

The process is preferably carried out at temperatures of from 85° to 150° C.

In the process of the invention, the nickel can adsorb mercury in an amount of up to 50% of its weight. When this value has been reached, the purifying action drops steeply, as may be determined, for example, by measuring the mercury content of the treated solution, for example by flameless atom absorption.

The nickel amalgamated with mercury may be regenerated by heating to temperatures of from 410° to 450° C. The liberated mercury is distilled off in a stream of inert gas, for example nitrogen or argon, and is then isolated by condensation.

The process of the invention may be generally used for removal of mercury from solutions which contain mercury in elementary or dissolved form and which do not attack nickel. It may be applied not only to aqueous solutions but also to solutions containing organic solvents. It is particularly suitable for the removal of mercury from aqueous solutions of alkali metal hydroxides, for example caustic soda or potash solutions, or methanolic solutions of sodium or potassium methoxide.

EXAMPLE 1

In a vertical tube having a diameter of 0.18 m there are provided two net electrodes of nickel, between which there is a 20 mm high filling of oxide-free carbonyl nickel powder having a particle size of from 100 to 200μm. A 50% w/w caustic soda solution having a temperature of 80° C is passed through said packing at a rate of 0.25 m$^3$/hr.

Below the packing there is provided a counterelectrode of titanium having an approximately 10μm thick surface coating of an alloy of 70% by weight of platinum and 30% by weight of iridium.

The potential of the nickel in 50% w/w caustic soda solution at a temperature of 80° C differs from the potential of the reversible hydrogen electrode by from +400 to +700 mV depending on the oxygen content of the solution. By connecting the two nickel net electrodes to one pole of a source of voltage and the counterelectrode to the upper pole, the potential of the nickel packing is adjusted to a value differing from the potential of the reversible hydrogen electrode by −22 mV and is maintained at this value.

This treatment of the caustic soda solution reduces its mercury content from 1,600 ppb prior to treatment to 3 ppb after treatment. If the above method is carried out without the application of an external voltage and thus without continuous reduction of the nickel, the mercury is reduced to only 100 ppb.

EXAMPLE 2

In a manner similar to that described in Example 1, a methanolic sodium methoxide solution having a concentration of 29.5% is passed through a 100 mm high cathodically polarized packing of oxide-free nickel wool having a fiber diameter of 65μm. The following Table lists the mercury contents of the solution before and after passing through the nickel packing, which is maintained at a potential differing from that of the reversible hydrogen electrode by −100 mV by the application of an external voltage, and at different temperatures. The potential of the nickel in the said solution without the application of an external voltage differs from that of the reversible hydrogen electrode in said solution by +500 mV.

TABLE

| Temperature °C | Mercury content before (ppb) | Mercury content after (ppb) |
|---|---|---|
| 50 | 7,000 | 80 |
| 60 | 7,000 | 50 |
| 80 | 7,000 | 10 |

We claim:

1. A process for the removal of mercury from a liquid containing mercury as an impurity in elemental or dissolved form, which process comprises treating said liquid by contact with a cathodically polarized nickel as one electrode in the presence of a counterelectrode consisting of platinum, graphite or magnetite and at a temperature of from 80° to 230° C, the potential of the nickel being adjusted by the application of an external voltage so as to have a value which differs from the potential of a said reversible hydrogen electrode in said liquid by not more than from −250 mV to +50 mV.

2. A process as claimed in claim 1, wherein the nickel is used in the form of Raney nickel, carbonyl nickel powder, nickel sponge, nickel felt, nickel chips or nickel wool.

3. A process as claimed in claim 1, wherein the temperature is from 85° to 150° C.

4. A process as claimed in claim 1, wherein the nickel is placed in a column in the form of loose packings between net cathodes and the liquid containing mercury is pumped through the packing.

5. A process as claimed in claim 1 wherein the nickel is used in the form of a deposite on a support having a high surface area.

6. A process as claimed in claim 1 wherein the nickel used as the cathodically polarized electrode is substantially free of oxide layers.

7. A process as claimed in claim 1 wherein the liquid being treated is an aqueous solution of an alkali metal hydroxide containing said mercury as an impurity.

8. A process as claimed in claim 1 wherein the liquid being treated is a methanolic solution of sodium or potassium methoxide.

9. A process as claimed in claim 1 wherein the nickel amalgamated with mercury during said treatment of the liquid is subsequently regenerated by heating to a temperature of from 410° to 450° C. to liberate the mercury.

10. A process as claimed in claim 9 wherein the liberated mercury is distilled off in a stream of inert gas and then isolated by condensation.

* * * * *

UNITED STATES PATENT AND TRADEMARK OFFICE
CERTIFICATE OF CORRECTION

PATENT NO. : 4,077,856

DATED : March 7, 1978

INVENTOR(S) : Wolfgang Habermann et al

It is certified that error appears in the above–identified patent and that said Letters Patent are hereby corrected as shown below:

Column 3, line 25, after "consisting" insert --essentially--.

Column 4, line 12, "deposite" should read --deposit--.

Signed and Sealed this

Twenty-second Day of August 1978

[SEAL]

Attest:

RUTH C. MASON
Attesting Officer

DONALD W. BANNER
Commissioner of Patents and Trademarks